(12) United States Patent
Chiang

(10) Patent No.: US 7,369,550 B1
(45) Date of Patent: May 6, 2008

(54) METHOD AND APPARATUS FOR LOCKING A TABLE IN A NETWORK SWITCH

(75) Inventor: John Chiang, San Jose, CA (US)

(73) Assignee: Advanced Micro Devices, Austin, TX (US)

( * ) Notice: Subject to any disclaimer, the term of this patent is extended or adjusted under 35 U.S.C. 154(b) by 740 days.

(21) Appl. No.: 10/734,237

(22) Filed: Dec. 15, 2003

Related U.S. Application Data

(63) Continuation of application No. 09/296,558, filed on Apr. 22, 1999, now abandoned.

(51) Int. Cl.
*H04L 12/54* (2006.01)
*G06F 13/00* (2006.01)
*G06F 15/173* (2006.01)

(52) U.S. Cl. .................. 370/389; 370/428; 709/238; 710/107

(58) Field of Classification Search ........ 370/389–392, 370/401–468; 710/107–117; 711/108–152
See application file for complete search history.

(56) References Cited

U.S. PATENT DOCUMENTS

| | | | |
|---|---|---|---|
| 4,937,736 A | 6/1990 | Chang et al. | |
| 5,142,676 A * | 8/1992 | Fried et al. | ............... 711/152 |
| 5,515,376 A | 5/1996 | Murthy et al. | |
| 5,856,972 A * | 1/1999 | Riley et al. | ............... 370/389 |
| 5,915,097 A * | 6/1999 | Chao | ............... 709/238 |
| 5,953,335 A | 9/1999 | Erimli et al. | |
| 6,052,751 A * | 4/2000 | Runaldue et al. | ............ 710/107 |
| 6,081,512 A | 6/2000 | Muller et al. | |
| 6,111,874 A | 8/2000 | Kerstein | |
| 6,112,258 A * | 8/2000 | Miller et al. | .................. 710/19 |
| 6,115,387 A * | 9/2000 | Egbert et al. | ............... 370/423 |
| 6,122,669 A | 9/2000 | Crayford | |
| 6,236,654 B1 | 5/2001 | Egbert | |
| 6,249,521 B1 | 6/2001 | Kerstein | |
| 6,292,483 B1 * | 9/2001 | Kerstein | ..................... 370/389 |
| 6,310,876 B1 | 10/2001 | Egbert | |
| 6,314,499 B1 | 11/2001 | Kermani | |
| 6,463,032 B1 * | 10/2002 | Lau et al. | .................. 370/218 |
| 6,480,490 B1 * | 11/2002 | Merchant et al. | ........... 370/389 |
| 6,483,844 B1 * | 11/2002 | Erimli | ........................ 370/428 |

\* cited by examiner

*Primary Examiner*—Man U. Phan
(74) *Attorney, Agent, or Firm*—McDermott Will & Emery

(57) ABSTRACT

An apparatus and method are disclosed for locking a table within a network switch. The table is used to store entries that contain addresses of network stations connected to the network switch. A scheduler regulates access to the address table by allocating prescribed time slots during which components of the network switch can access the address table. Each component requiring access to the address table must wait until it is assigned a time slot in order to further determine if any other components are accessing the address table. If none of the other components are accessing the address table, then the component requiring access can initiate a transaction.

15 Claims, 11 Drawing Sheets

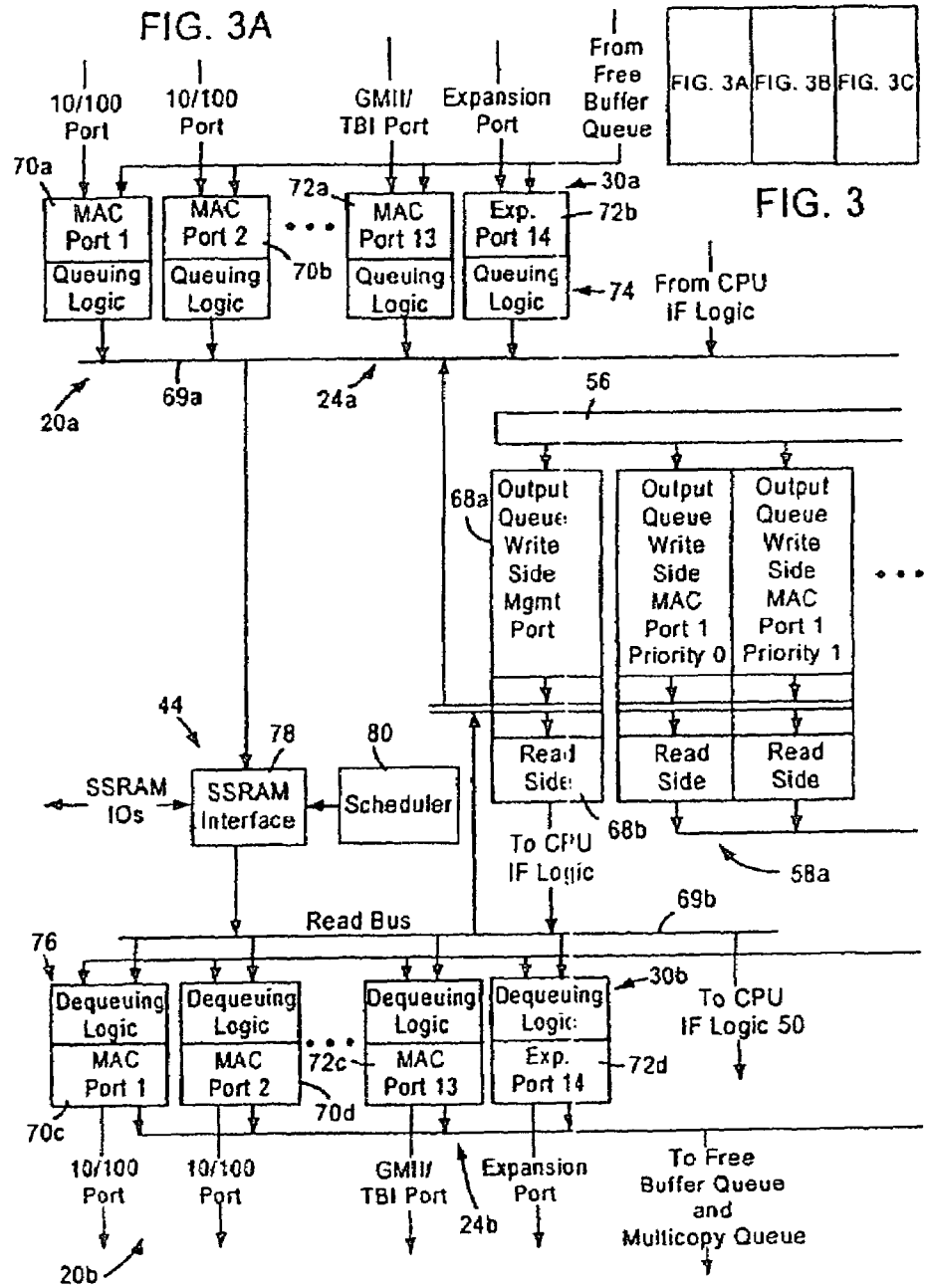

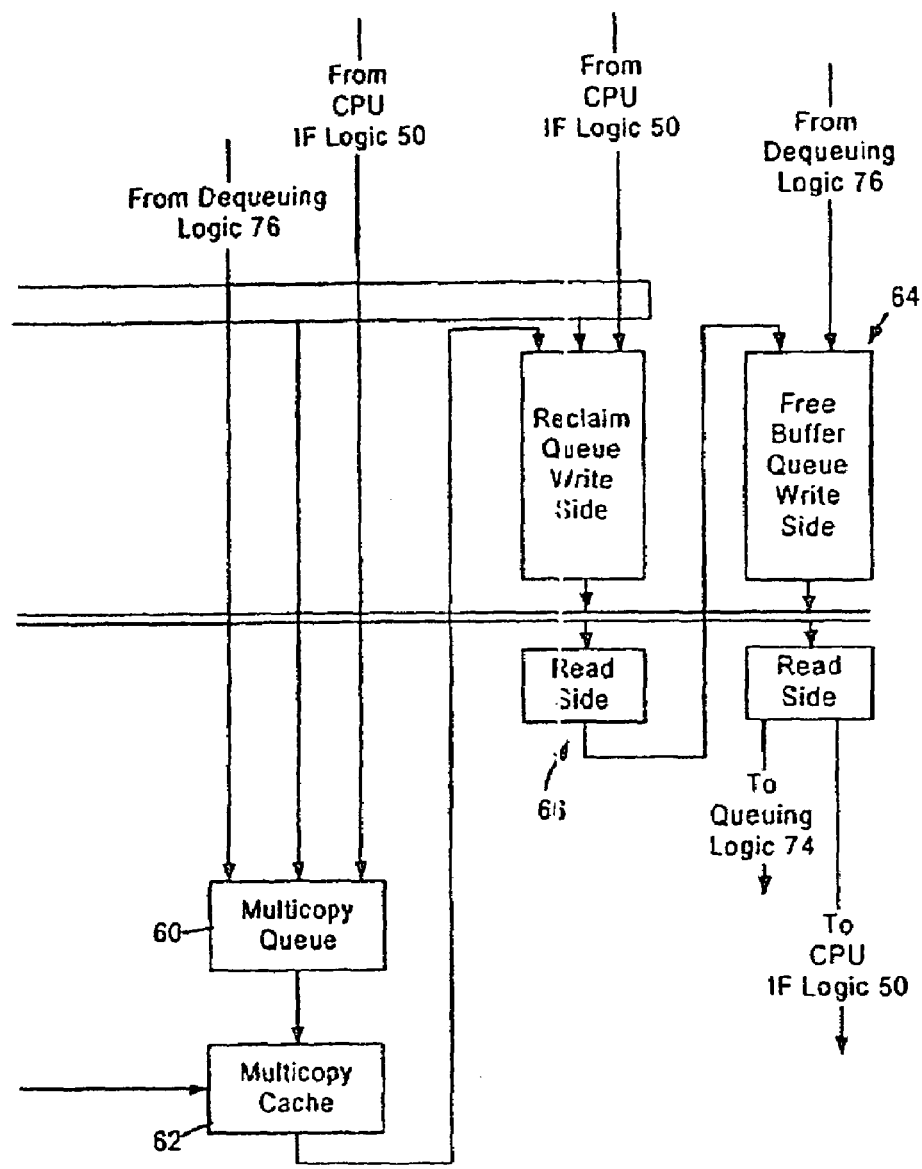

METHOD AND APPARATUS FOR LOCKING A TABLE IN A NETWORK SWITCH

RELATED APPLICATION

This application is a continuation of and contains subject matter related to the subject matter disclosed in U.S. patent application Ser. No. 09/296,558, filed on Apr. 22, 1999 now abandoned.

FIELD OF THE INVENTION

The present invention relates to communication systems, and more particularly, to a method and apparatus for controlling access to an address table in a network switch.

DESCRIPTION OF THE RELATED ART

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program, and is segmented into multiple data frames and subsequently transmitted in order to simplify processing and minimize the retransmission time required for error recovery. In a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The switch makes forwarding decisions upon receipt of the data frames based on information contained in a header of each data frame. For example, if a received data frame is to be transmitted to a number of end stations, the switch must make the forwarding decision to forward the data frame to the ports of the correct end stations. In order to make forwarding decisions, most network switches utilize an address (or routing) table that stores addresses of workstations connected to the network.

The address table is ordinarily configured to allow access by multiple components of the network switch. Hence, during normal operation, all components capable of accessing the address table must place a request through an arbiter (or similar decision-making component) in order to eliminate potential conflicts. For example, the network switch may include a first component that is responsible for initializing and updating the address table with the addresses of workstations currently connected to the network switch. A second component may be responsible for searching the address table when data frames are received in order to allow the network switch to make forwarding decisions. In systems where the address table stores a static number of addresses, a third component may be responsible for determining which addresses may be removed from the address table based on inactivity between the addressed workstation and the network switch.

As data frames are received by the network switch, all three components will attempt to access the address table in order to perform their assigned tasks. It is therefore imperative that appropriate precautions be taken to avoid the potential conflicts that may result when two or more components simultaneously attempt to access the address table. Furthermore, additional conflicts may result if, for example, the first component attempts to modify an entry in the address table before the second component completes its modifications to the same entry. This situation is further complicated when the network switch incorporates an address table that contains multiple addresses per entry. For example, entry number five may contain three workstation addresses that are linked together. If the first component is updating entry number five, and the second component performs a search of the address table, then the results of the search (at least with respect to entry number five) may not be completely accurate. Additionally, errors may occur if both the first component and the second component attempt to access the same address within the entry.

One possibility for minimizing the potential errors associated with multiple components accessing the address table is to provide arbitration logic for controlling access to the address table. The arbitration logic includes both circuitry to receive and prioritize the requests, and to grant access to the address table. According to such an arrangement, the individual components may not freely access the address table in order to perform their assigned tasks. Rather, each component must request access to the address table through the arbitration logic, hence reducing the possibility of multiple access to the same entry.

The aforementioned arrangement has a disadvantage of requiring additional logic to receive requests, perform arbitration, and grant access to the address table. This is particularly problematic in systems wherein the network switch is embodied on a single chip. Real estate on the chip is particularly expensive, and therefore, it is desirable to minimize the amount and complexity of the components that will reside on the chip.

Accordingly, one problem associated with network switches is the potential for conflicts resulting from multiple components attempting to simultaneously access the address table. Another problem associated with network switches is the amount and complexity of the logic normally incorporated on the chip in order to reduce such potential conflicts.

DISCLOSURE OF THE INVENTION

There exists a need for an arrangement capable of providing controlled access to an address table without the use of arbitration logic. There is also a need for an arrangement that minimizes the amount and complexity of the logic that resides on-chip within a network switch.

These and other needs are addressed by the present invention wherein a multiport switch that selectively receives data frames includes circuitry for selectively providing access to an address table by multiple components without the use of arbitration logic.

In accordance with one aspect of the present invention, a method of locking an address table within a network switch comprises the steps: allocating prescribed time slots for accessing the address table to various components of the multiport switch; determining, during a time slot allocated to a designated component, if any of the other components are currently transacting with the address table; locking out the designated component from accessing the address table, if one of the other components is currently transacting with the address table; and allowing the designated component access to the address table if none of the other components are currently transacting with the address table. The present method improves access to the address table while minimizing the amount of logic normally required to reduce potential conflicts. This is accomplished by designating prescribed time slots during which various components of the network switch may access the address table. Each component of the network switch must then determine, during its assigned time slot, if other components are accessing the address table prior to conducting a transaction.

In accordance with another aspect of the present invention, an arrangement is provided for controlling access to information stored in a network switch. The arrangement includes an address table, a plurality of components, and a scheduler. The address table stores entries that contain addresses of network stations connected to the network switch, and allows access to the entries by the plurality of components. The scheduler allocates prescribed time slots to each component for accessing the address table. Each component is configured to determine if any other components are currently transacting with the address table during its allocated time slot. If none of the other components are currently transacting with address table, then the component assigned the current time slot will proceed to access the address table. According to the present arrangement, access to the address table is improved, while minimizing the amount of logic normally required to reduce potential conflicts.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
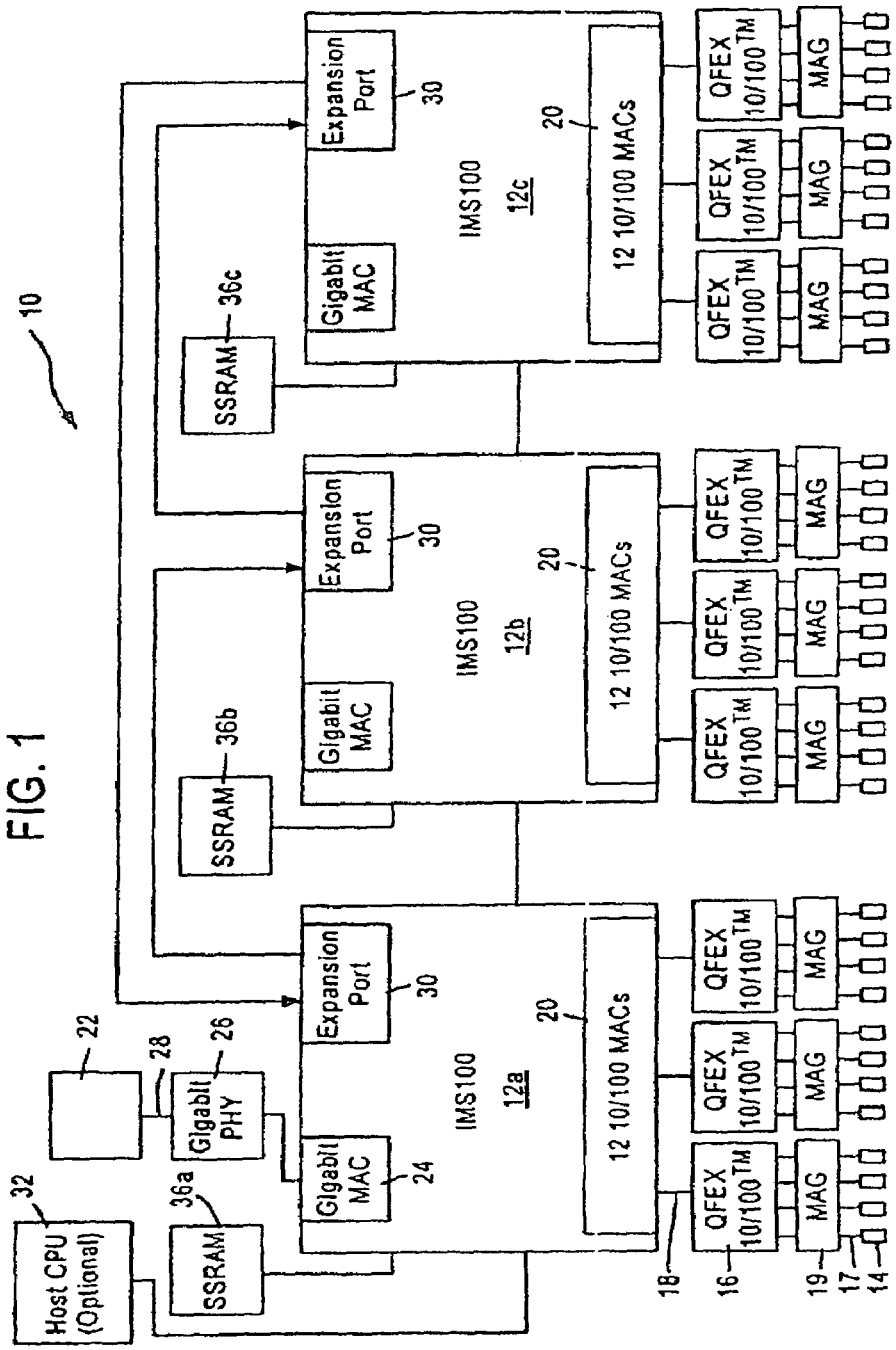
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/EEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
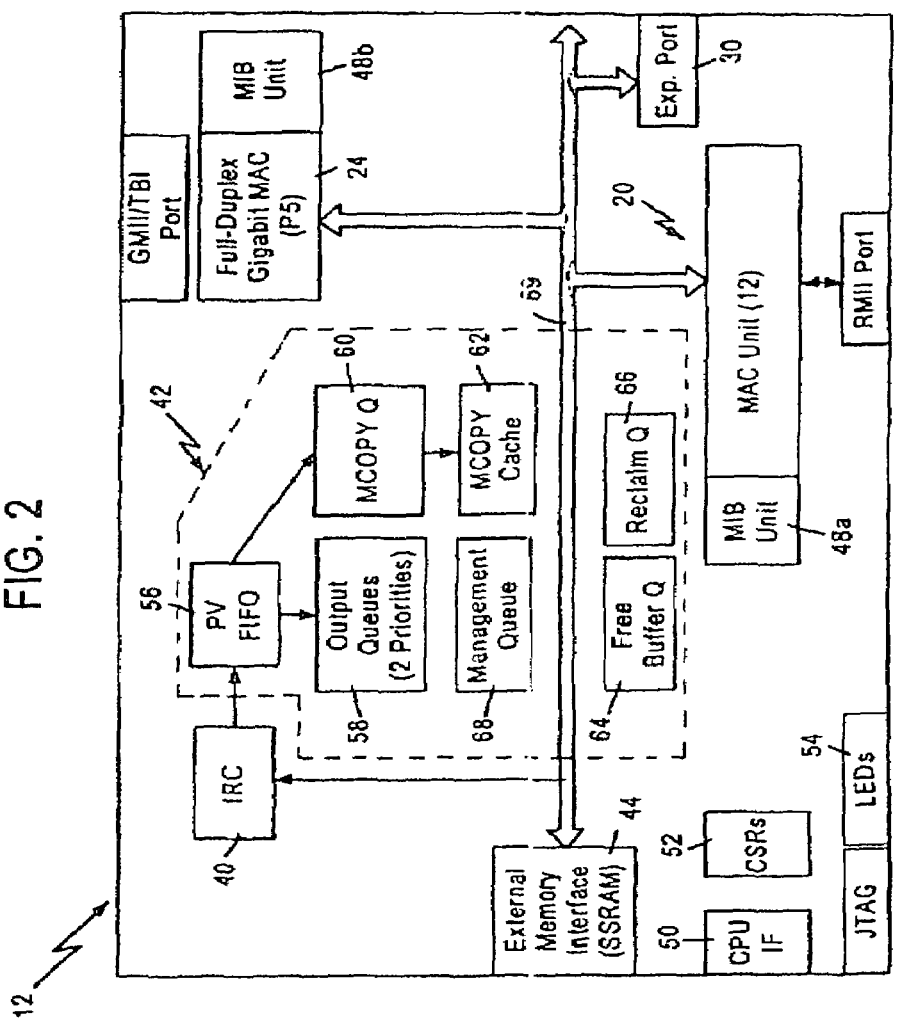
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring data frames according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit mode 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SS-RAM), in order to minimize the chip size of the multiport switch 12. In particular, the multiport switch 12 uses the external memory 36 for storage of received data frames, memory structures, and MIB counter information. The external memory 36 is preferably either a Joint Electron Device Engineering Council (JEDEC) pipelined burst or Zero Bus Turnaround™ (ZBT)-SSRAM having a 64-bit wide data path and a 16-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data frame may include a VLAN (virtual LAN) tagged frame according to IEEE 802.1d protocol that specifies another network (e.g., via a gateway such as the gigabit mode 22) or a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the data frame for transmission (e.g., 10/100 MAC ports 1-12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the port vector is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
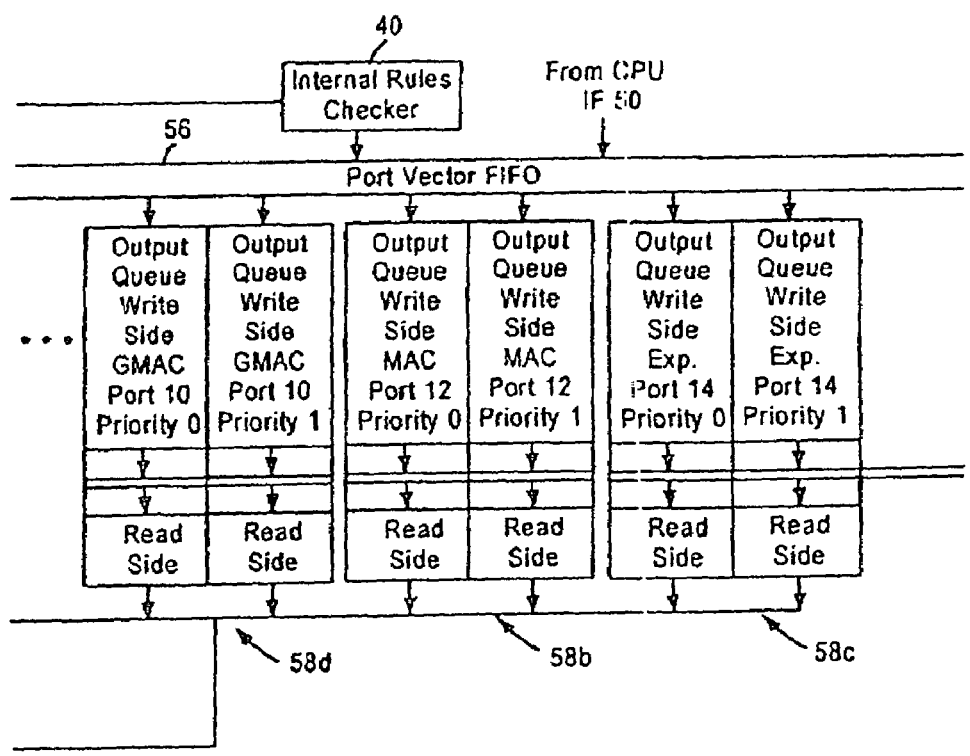
FIG. 3 is a block diagram illustrating in detail the switching subsystem of FIG. 2.

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include four (4) quad-MAC enhanced (QMACE) modules (only two of each shown and referenced by numerals 70a, 70b, 70c, and 70d) configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; etc. The QMACE modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a data frame in an internal FIFO upon reception from the corresponding switch port. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). The data frame is then transferred over a write data bus 69a from the receive FIFO to the external memory 36 in a direct memory access (DMA) transaction during the assigned slot based on the retrieved frame pointer. The data frame is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the output queues 58 or the management queue 68, should receive the associated frame pointer. The port vector FIFO 56 places the frame pointer into the top of the appropriate queue 58 and/or 68. This queues the transmission of the frame. Each output queue 58 is processed separately by the host CPU 32 via the CPU interface 50.

As shown in FIG. 3, each of the transmit MAC units 70c, 70d, 72d, and 72c has an associated output queue 58a, 58b, 58c, and 58d, respectively. Although not shown in FIG. 3, in preferred embodiments each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the data frame from the external memory 36 at the memory location specified by the frame pointer. The scheduler 80 schedules the request, and issues a grant for the dequeuing logic 76 of the transmit gigabit port 24b to initiate a DMA read during the assigned slot. In response to the grant, the dequeuing logic 76 reads the data frame (along the read bus 69b) in a DMA transaction from the location in external memory 36 pointed to by the frame pointer, and stores the data frame in the internal transmit FIFO for transmission by the transmit gigabit MAC 72c. If the frame pointer specifies a unicopy transmission, the frame pointer is returned to the free buffer queue 64 following writing the data frame into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the data frame for a particular output port based on a fetched frame pointer and stores the data frame in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the internal rules checker (IRC) 40 and address table used in making forwarding decisions will be discussed, followed by the details for controlling access to information stored in the address table 84.

IRC and Frame Forwarding

Figure 4:
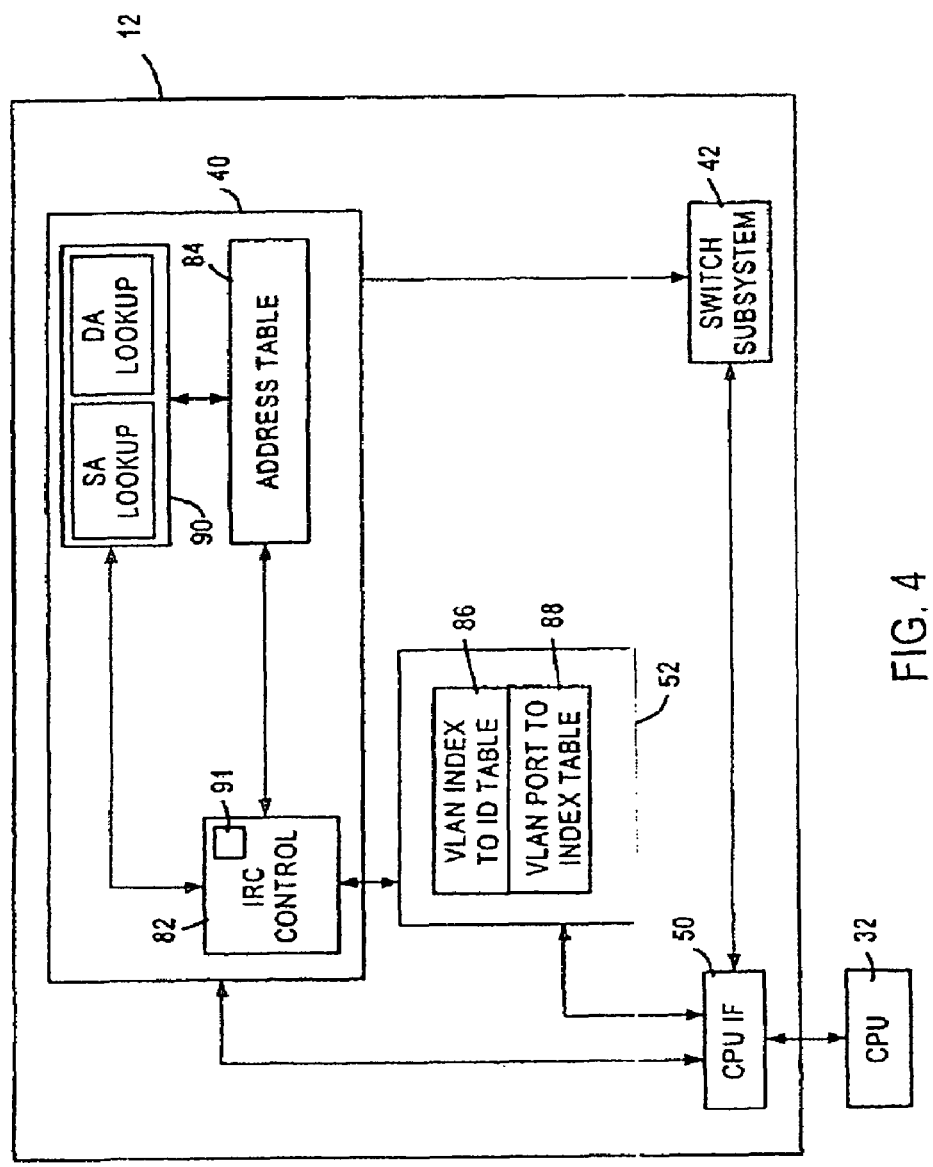
FIG. 4 is a block diagram of a system including the internal rules checker of FIG. 2 in accordance with an embodiment of the present invention.

FIG. 4 illustrates the IRC 40 which includes an IRC controller 82, an address table 84, address look-up logic 90, and aging logic 91. In the exemplary embodiment, the address table 84 is located within the IRC 40. In alternative embodiments, the address table may be located outside the IRC 40 within another part of the switch 12 or even external to the switch 12. In addition, the aging logic 91 is located within the IRC controller 82.

The address look-up logic 90 includes a source address (SA) look-up portion and a destination address (DA) look-up portion. The SA look-up portion is responsible for searching the address table to locate a match between a source address from the header of a received data frame and entries in the address table 84. The DA look-up portion searches the address table to obtain a match between the destination address from the header of the received data frame and entries in the address table 84.

In the exemplary embodiment, the address table 84 supports 4096 user addresses and capabilities for 64 unique virtual local area networks (VLANs), although the number of addresses and VLANs supported may be increased by expanding the table size. The VLANs provide "broadcast domains" whereby broadcast traffic is kept "inside" the VLAN. For example, a specific VLAN may contain a group of users at a high level of an organization. When sending data to this group of users, the data may include a specific VLAN identifier associated with this particular group to ensure that only these users receive the data. These VLAN groupings can be thought of as "sub-networks" within a larger network. In addition, the IRC 40 passes the header of each received data frame through the address look-up logic 90 in order to obtain matching entries within the address table 84.

Figure 5:
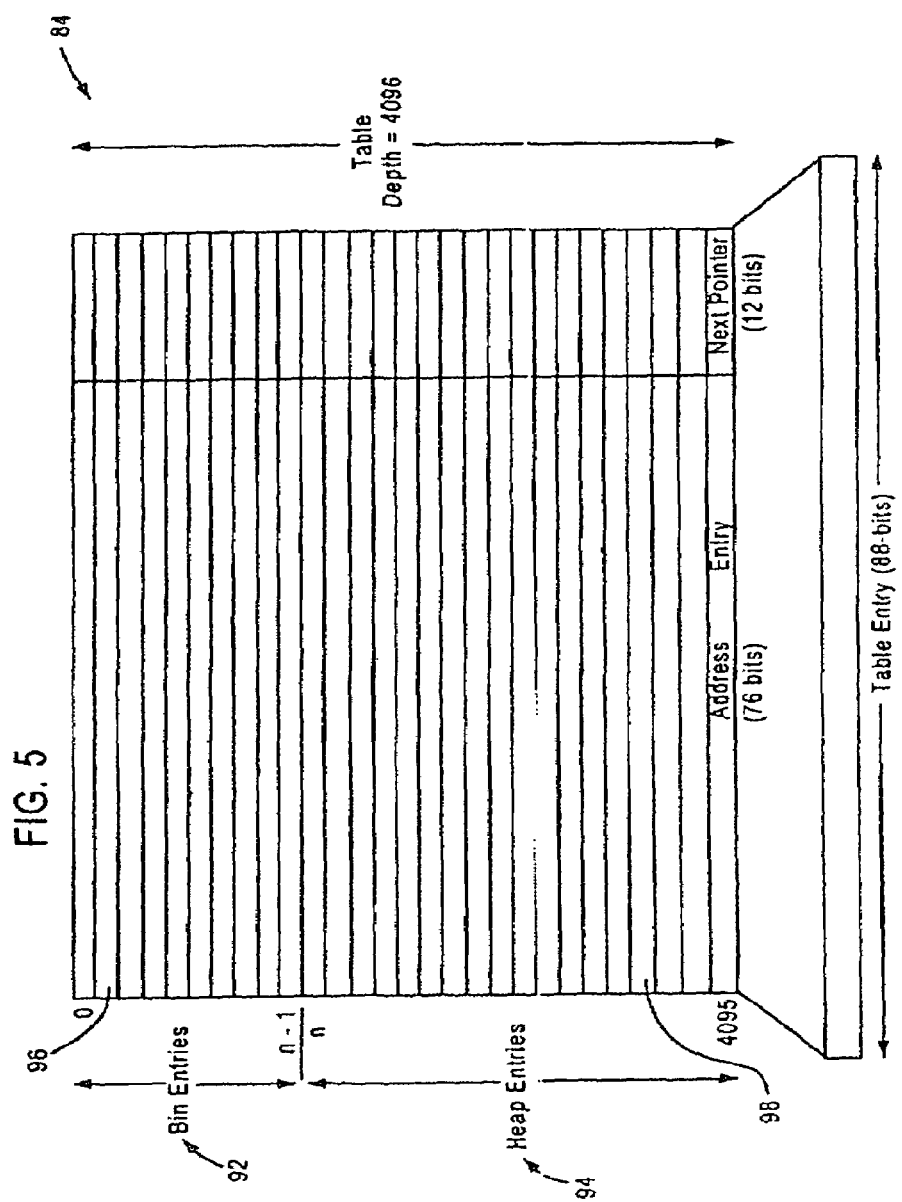
FIG. 5 illustrates the composition of the address table of FIG. 4.

FIG. 5 illustrates the organization of the IRC address table 84. The IRC address table 84 contains an array of 4096 entries. The first "n" entries form bin portion 92 and are referred to as "bin entries" 96 and have addresses from "0" to "n−1". The remaining entries form bin portion 94 and are referred to as "heap entries" 98 and have addresses from "n" to "4095". Each of the table entries includes a 76-bit address entry field and a 12-bit "next pointer" field.

Figure 6:
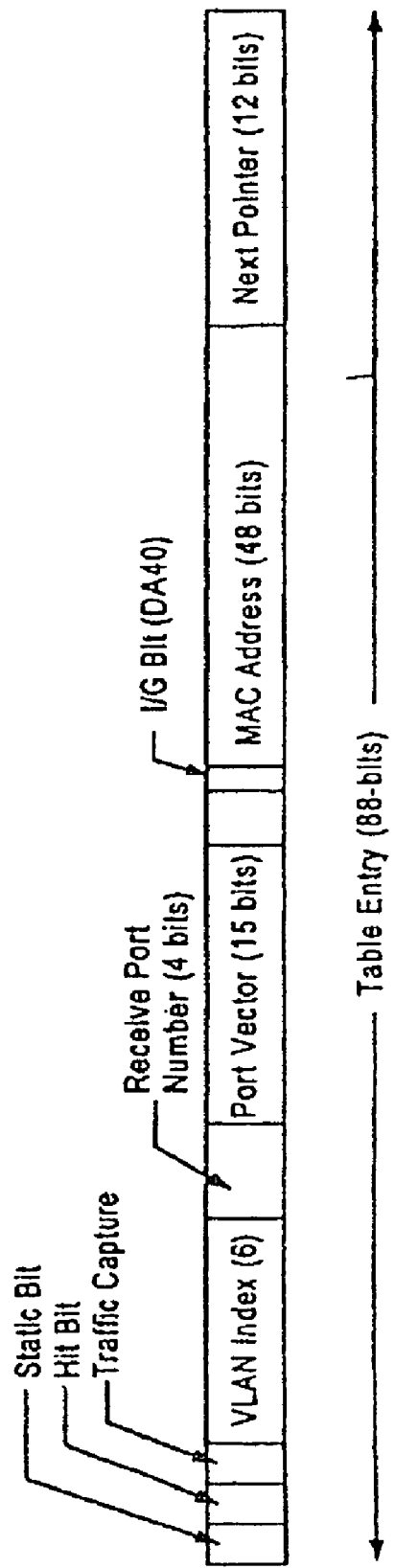
FIG. 6 illustrates the format of an IRC address table entry of the IRC address table of FIG. 5.

FIG. 6 illustrates the composition of each 88-bit table entry shown in FIG. 5. A hit bit is used by the IRC controller 82 for address entry "aging", discussed in more detail below, to delete entries from the address table 84. A static bit, also referred to as an aging override bit, is used to prevent deletion of an address entry within the address table 84.

A traffic capture bit is used to identify traffic capture source and destination MAC addresses for mirroring MAC conversations to the management queue 68. Each entry in the address table also includes a 6-bit VLAN index field used to reference a 12-bit VLAN identifier (ID). A VLAN index-to-VLAN ID table 86, shown in FIG. 4, contains the necessary mapping associations. During normal operation, the multiport switch 12 can receive both tagged and untagged frames. When the multiport switch 12 receives untagged data frames, i.e., without VLAN tag information, the IRC 40 assigns a VLAN index from a VLAN port-to-index table 88, based on the receive port on which the data frame is received. The VLAN index-to-ID table 86 and the VLAN port-to-index table 88 are located with the configuration and status registers 52. However, in alternative configurations, the tables 86 and 88 may be located within the IRC 40.

The receive port number field is a 4-bit field that identifies the port on which the associated MAC address resides. The port vector is a 15-bit field that provides a forwarding descriptor with a vector identifying the ports to which the data frame should be forwarded.

The MAC address field is a 48-bit field that includes both source addresses and destination addresses. The addresses stored in the MAC address field can be unicast, multicast or broadcast. An individual/group (I/G) bit is also included in the MAC address field.

During normal operation of the multiport switch, the host CPU 32 functions as the management entity and is connected to the IRC 40 via the CPU IF 50. Alternatively, a management MAC may be connected to the CPU IF 50 to function as the management entity.

Typically, the host CPU 32 is responsible for initializing the values in the address table 84. Upon power-up, the host CPU 32 loads values into the bin entries 96 based on the network configuration, including VLAN configurations. The heap entries 98 are not fixed at power-up and are used for adding entries to the address table 84. The IRC 40 uses the specific fields of the address table 84 to make frame forwarding decisions when frames are received by the multiport switch 12. More specifically, the IRC controller 82 includes control logic to search the address table 84 for frame forwarding information. From the information found in the address table 84, the IRC controller 82 creates a forwarding descriptor, which includes a frame pointer, a forwarding port vector, a receive port number, a VLAN ID, a priority class, and a control opcode. The IRC controller 82 then transmits the forwarding port vector to the port vector FIFO 56 for queuing, as illustrated in FIG. 3.

To generate the forwarding decision, the IRC controller 82 performs a source address (SA)/VLAN index/Receive (Rx) port number search and a destination address (DA)/VLAN index search. The switch 12 needs to make frame forwarding decisions relatively quickly, since multiple data frames may be received by the switch 12 simultaneously. Hence, in the exemplary embodiment of the present invention, a hashing scheme is used to search only a subset of the address entries, as described below.

The memory structure of FIG. 5 provides an indexed arrangement, where a given network address will be assigned to a corresponding bin. In other words, each bin entry 96 is configured to reference a plurality of table entries (i.e., heap entries) 98. Hence, the IRC controller 82 performs a search of the address table 84 by first accessing a specific bin entry 96 pointed to by a hash key, and then searching the entries within (i.e., referenced by) the corresponding bin to locate the appropriate match.

Each bin entry 96 is the starting point for the search by the IRC controller 82 for a particular address within the address table 84. A bin entry may reference no addresses (i.e., be empty), may reference only one address within the bin entry location, or may reference a plurality of addresses using a linked list chain structure.

Figure 7:
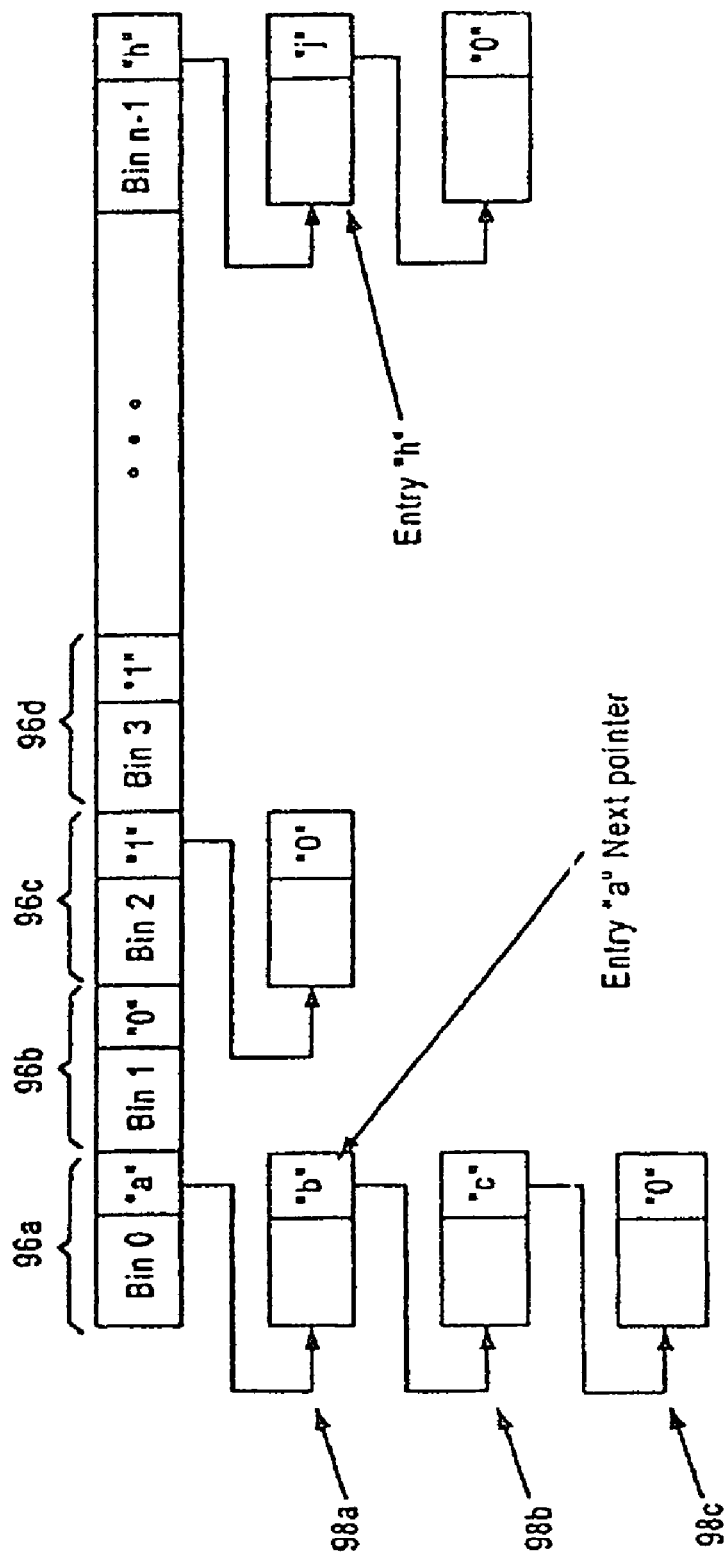
FIG. 7 illustrates linked list chains for identifying table entries relative to a selected bin.

FIG. 7 is a diagram illustrating bin entries referencing a different number of table entries. Each of the bin entries 96 and heap entries 98 includes the 76-bit address entry and a 12-bit "next pointer" field. The "next pointer" field associated with the bin entry 96 identifies the location of the next entry in the chain of linked list addresses. For example, Bin 3, 96*d*, of FIG. 7 does not have any associated table entries. In such a case, the 76-bit address entry equals zero (or another null value), and the bin's corresponding "next pointer" field will have a value of "1", indicating no entries for the corresponding bin. If a bin such as Bin 1, 96*b*, contains a single table entry, the bin entry will store the switching logic data for that single address in its address entry field, and store the value "zero" in the "next pointer" field, indicating there are no further address entries in the chain. Bin 0, 96*a*, however, references four addresses by using the "next pointer" field to identify the location of the next entry in the chain. The additional entries 96*b*-96*d* in the bin are linked in a linear list, as shown in FIG. 7. Thus, the first entry of Bin 0 is stored in the address entry field of the bin entry 96*a* and the next entry (heap entry 98*a*) is referenced by address entry "a" in the next pointer field of the bin entry 96*a*.

Address Table Locking

As suggested by the above description, the address table 84 represents an important part of the IRC 40. The information stored in the address table 84 must normally be accessible to various components of the multiport switch 12 throughout the operation of the switch 12. The address table 84 is primarily accessed by three components of the multiport switch 12 during normal operations. Specifically, the address table 84 may be accessed by the CPU 32, the address look-up logic 90, and the aging logic 91. Once accessed, various operations can be performed on entries stored in the address table 84 by these individual components. For example, in order to properly forward received data frames, the address look-up logic 90 will search the address table 84 in order to obtain a match between source and destination addresses stored in the received data frame and source and destination addresses stored in the address table 84. The aging logic 91 must age (i.e., remove) entries from the address table 84 after a prescribed aging interval has expired, and add entries pertaining to network stations 14 whose addresses have been recently learned. Since both of these components (address look-up logic 90 and aging logic 91) can independently access the address table 84, the present invention provides an appropriate and efficient locking mechanism in order to avoid potential conflicts and errors that may arise from multiple components attempting to access the address table 84 simultaneously.

Figure 8:
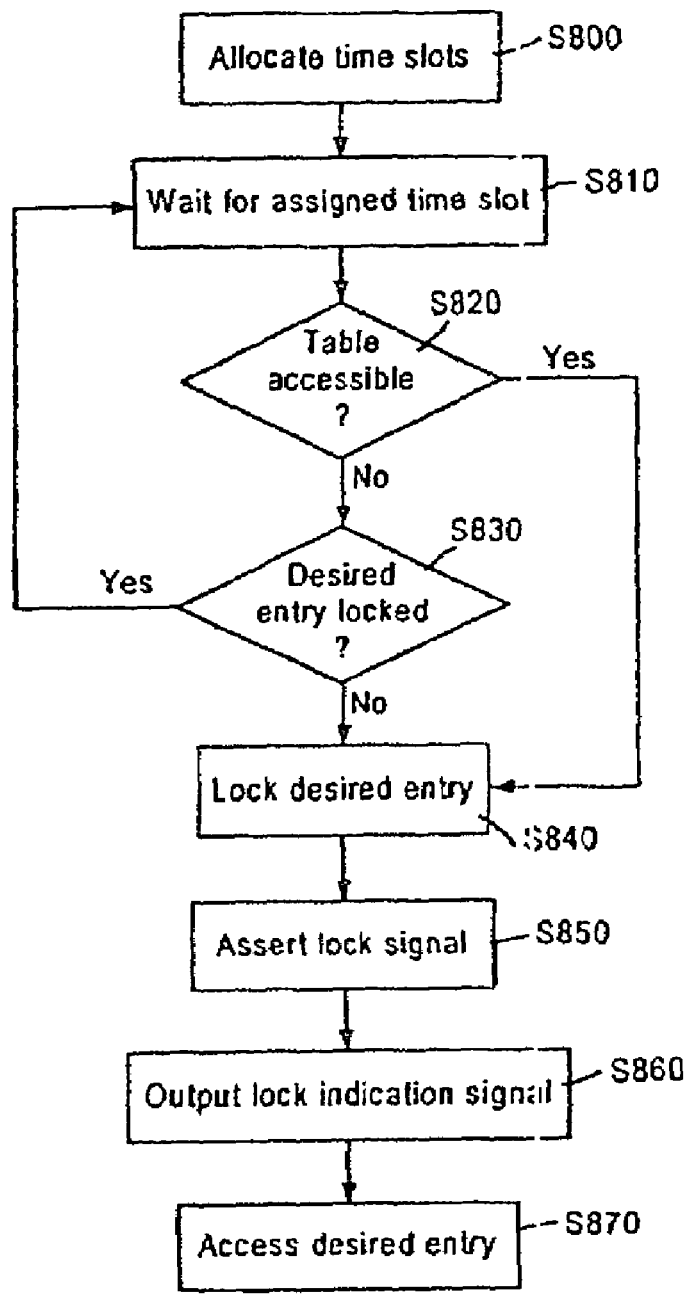
FIG. 8 is a flow chart illustrating the steps performed when a component requires access to the address table.

FIG. 8 is a flow chart illustrating the steps performed by a component of the multiport switch 12 when access to the address table 84 is required. Step S800 corresponds to a point in time subsequent to initialization of the multiport switch 12. All components of the multiport switch 12 are ready for normal operations, and the address table 84 has been initialized. At this point, the scheduler 80 allocates prescribed time slots to the components of the multiport switch 12. Each prescribed time slot corresponds to a particular length of time, for example, one CPU clock cycle, during which a designated component may access the address table 84.

When a designated component such as, for example, the aging logic 91 requires access to the address table 84, it must first wait until it is allocated a time slot by the scheduler 80. Accordingly, at step S810, the designated component (i.e., the aging logic 91) waits until it is allocated a time slot by the scheduler 80. Allocation of a time slot alone, however, does not guarantee access to the address table 84. It is possible that one of the other components may be in the process of conducting a transaction with the address table 84 during the time slot allocated to the designated component. Such a transaction can include either reading, writing, or a combination of both reading and writing of entries within the address table 84. Depending on the specific implementation, various restrictions can be placed on the address table 84 based on the transaction currently in progress. For example, a read transaction can allow shared access, by another component, for reading information from the address table 84. A write transaction can restrict access to the address table 84 completely. Further, rather than placing restrictions on the entire address table 84, the present invention can be configured to place restrictions on individual bin entries 96 within the address table 84, since each bin entry 96 can contain a plurality of address entries.

At step S820, the designated component must determine if any other component is currently conducting a transaction with the address table 84. If none of the other components are currently performing a transaction with the address table 84, then the address table 84 may be accessed by the designated component. If, however, one of the other components is currently conducting a transaction with the address table 84, then the designated component must wait until it is allocated another time slot by the scheduler 80, before it can again determine whether the address table 84 is accessible. In order to determine whether or not the address table 84 may be accessed, the designated component checks the status of a plurality of lock signals prior to accessing the address table 84. Each component of the multiport switch 12 that is capable of accessing the address table 84 is also capable of asserting a lock signal that indicates it is currently conducting a transaction with the address table 84.

According to one embodiment of the present invention, the components must further specify which bin entry 96 in the address table 84 they are currently accessing. According to such an embodiment, even if the designated component determines that the address table 84 is accessible, it must further specify, at step S830, if the bin entry 96 within the address table 84 that it desires access to, is currently accessible. If the desired bin entry 96 is locked, then control returns to step S810 and the designated component must again wait until it is allocated another time slot by the scheduler 80. Further, according to such an embodiment, various types of locks may be placed on the address table 84. For example, the entire address table 84 can be completely locked thereby preventing both read and write access to any of the entries (bin entries 96 and heap entries 98) stored therein. A read lock can be placed on the address table 84 in order to prevent modification of any entries stored therein, while allowing read access to any such entries. In addition, locks may be placed on individual bin entries 96 that are stored in the address table 84, thereby allowing other components both read and write access to bin entries 96 that are not currently locked.

According to one embodiment of the invention, steps S820 and S830 can be combined into a single step wherein the designated component determines if a desired bin entry 96 is locked, rather than individually checking the address table 84 (step S820) and the desired bin entry 96 (step S830). Hence, control would pass to either step S810 or step S840 depending on whether the desired bin entry 96 is locked or unlocked, respectively.

Under normal circumstances, if the address table 84 is accessible, and the desired bin entry 96 is not locked, then control passes to step S840. At step S840, the designated component places a lock on the desired bin entry 96. According to one embodiment of the present invention, the designated component places a lock on a desired bin entry 96 by simply asserting its lock signal. In addition, depending on the specific implementation of the present invention, the designated component will also specify which bin entry 96 in the address table 84 it currently has a lock on. This is illustrated by step S850 wherein the designated component asserts its lock signal.

According to one embodiment of the present invention, rather than asserting its lock signal, a designated component will transmit (step S860) a lock indication signal to each component that is capable of accessing the address table 84. The lock indication signal may simply specify that the designated component is accessing the address table 84, or it may further specify which specific bin entry 96 within the address table 84 is currently being accessed by the designated component. Once the lock signal has been asserted, and/or the lock indication signal has been transmitted, the designated component will then access the address table 84 as indicated at step S870. The designated component will continue to access the address table 84 until it completes its transaction. During this time period, the other components will normally not be able to access the address table 84.

When the CPU 32 requires access to the address table 84, a slightly different procedure is followed. The CPU 32 is an important resource whose time must be divided between various components of the multiport switch 12, as well as various components of the host station 14 to which the multiport switch 12 is connected. Therefore, the CPU 32 is not allowed to remain idle, but must still wait until a transaction that is currently in progress has been completed before it can access the address table 84.

Figure 9:
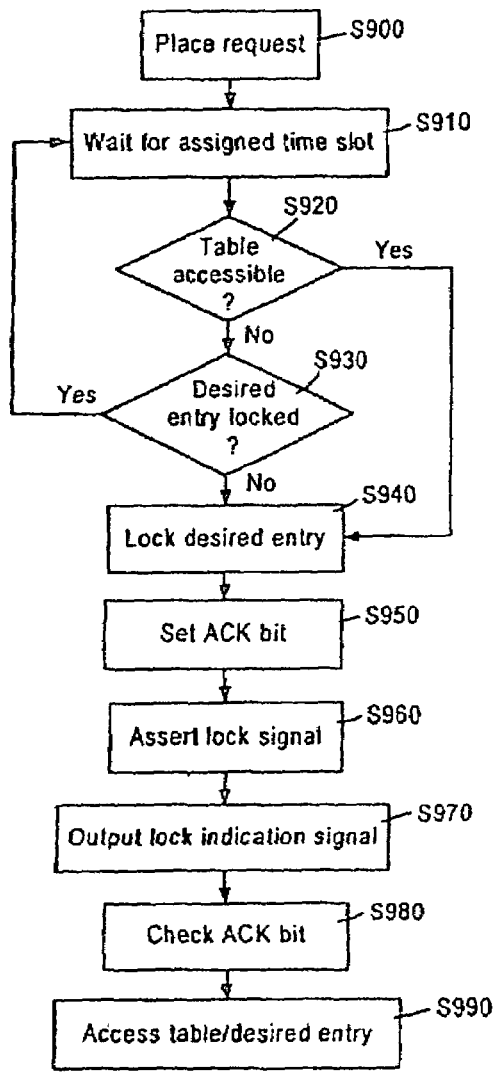
FIG. 9 is a flow chart illustrating the steps performed when the CPU requires access to the address table.

FIG. 9 is a flow chart illustrating the steps performed when the CPU 32 requires access to the address table 84. At step S900, the CPU 32 places a request that indicates its desire to access the address table 84. The request is placed through the CPU interface 50 that interfaces the CPU 32 to the multiport switch 12. Once the CPU 32 places the request with the CPU interface 50, it returns to management of the host network station 14 and/or multiport switch 12. The CPU interface 50 is then responsible for obtaining access to the address table 84 and informing the CPU 32 when the address table 84 is available.

Figure 10:
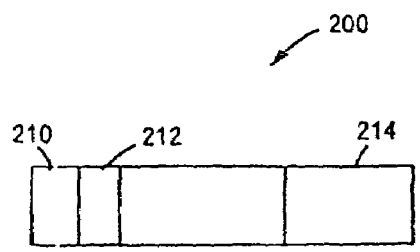
FIG. 10 is a block diagram of an exemplary bin lockout register according to an embodiment of the present invention.

Referring additionally to FIG. 10, an exemplary bin lockout register 200 according to an embodiment of the present invention is illustrated. The bin lockout register 200 may be located within various components of the multiport switch 12 such as, for example, the CPU interface 50 or configuration and status registers 52. The bin lockout register 200 includes a request lock bit 210, an acknowledge bit 212, and a bin number 214. The request bit 210 is set by the CPU 32, when the CPU requires access to a particular entry in the address table 84. In addition, the CPU writes the bin number of corresponding to the particular bin entry 96 within the bin number field 214. The acknowledge bit 212 is set to indicate to the CPU 32 that the particular bin entry is accessible. The CPU 32 will then proceed to access and/or modify the particular bin entry 96. The exemplary bin lockout register 200 provides a convenient conduit for the CPU 32 to place requests for accessing specific entries within the address table 84. Step S900 can thus be performed, according to the exemplary embodiment of the invention, by setting the request bit 210 in the bin lockout register 200. In addition, the CPU 32 can also write the number corresponding to the particular bin entry 96, to which it desires access, within the bin number field 214.

At step S910, the CPU interface 50 awaits allocation of a time slot by the scheduler 80. During its allocated time slot, the CPU interface 50 checks to see if the address table 84 is accessible, at step S920. As previously stated, this can be accomplished by either determining if any of the lock signals are asserted, or if a lock indication signal has been received from one of the other components by the CPU interface 50. If the address table 84 is accessible, then control transfers to step S940, otherwise the CPU interface 50 will continue checking to see if the address table 84 is available for access.

There are a variety of ways in which the CPU interface 50 can check the status of the address table 84. For example, according to one embodiment of the present invention, the CPU interface 50 will wait until its next allocated time slot before checking to see if the address table 84 is accessible.

In other embodiments, however, access to the address table 84 by the CPU 32 is given a higher priority than access by any other component of the multiport switch 12. Therefore, rather than waiting for its allocated time slot to check the status of the address table 84, the CPU interface 50 will continually check the status of the address table 84 during each time slot. Such an embodiment has a benefit of minimizing the wait time required for the CPU 32 to access the address table 84. For example, if the CPU interface 50 checks the status of the address table 84 at a particular point in time and determines it to be inaccessible, then the CPU 32 will not be able to access the address table 84. If however, the CPU interface 50 must wait until its next allocated time slot to check the status of the address table 84, it is very likely that another component having a time slot allocated prior to allocation of a time slot to the CPU interface 50 can obtain access to the address table 84, thereby increasing the amount of time that the CPU 32 must remain idle while awaiting access to the address table 84.

Depending on the specific implementation of the present invention, it may be necessary for each component to indicate which specific bin entry 96 within the address table 84 is currently being accessed. Hence, at step S930, the CPU interface 50 will check to see if the bin entry 96 desired by the CPU 32 (i.e., the bin entry 96 identified in the bin number field 214) is currently locked or available for access. If the desired bin entry 96 is currently locked, then the CPU interface 50 will continue to check the status of the address table 84 until the bin entry 96 is available, as indicated by returning to step S920. If the desired bin entry 96 is not locked, then the CPU interface 50 will immediately place a lock on the desired bin entry 96 at step S940.

Similar to the embodiment previously described with respect to FIG. 8, steps S820 and S830 can be combined into a single step. In such a combined step, the CPU 32 determines if a desired bin entry 96 is locked, rather than individually examining the address table 84 (step S920) and the desired bin entry 96 (step S930). Hence, control would pass to either step S910 or step S940 depending on whether the desired bin entry 96 is locked or unlocked, respectively. Further, according to such an embodiment, the CPU 32 will lock the bin entry 96 currently being accessed at step S840.

At step S950, the CPU interface 50 sets the acknowledge bit 212 to indicate that it has successfully locked the desired bin entry 96 for access by the CPU 32. At step S960, the CPU interface 50 asserts its lock signal to indicate that it has placed a lock on the address table 84 and/or a specific bin entry 96 stored therein. As previously indicated, the CPU interface 50 may further provide an indication of which specific bin entry 96 within the address table 84 it currently has a lock on. Depending on the specific embodiment of the present invention being implemented, the CPU interface 50 may further output (step S970) a lock indication signal to all components that are capable of accessing the address table 84. When the CPU 32 can access the address table 84, it will check to see if the CPU interface 50 has set the acknowledge bit 212.

Accordingly, at step S980, the CPU 32 checks to see if the acknowledge bit 212 is set. If the acknowledge bit 212 is set, then the CPU 32 will proceed to access the address table 84 and/or the desired bin entry 96 at step S990. If the acknowledge bit 212 is not set, then the CPU 32 will proceed with performing other tasks until it again is capable of accessing the address table 84 at which time it will again check to see if the acknowledge bit 212 has been set. Hence, the acknowledge bit 212 prevents the CPU 32 from accessing the address table 84 until the CPU interface 50 has secured a lock on either the address table 84 and/or the specific bin entry 96 that the CPU 32 requires access to.

The present arrangement provides improved access to the address table, while minimizing the amount of logic normally required to reduce potential conflicts. This is particularly important because real estate on the chip is expensive, and a balance must often be made between efficiency and cost. According to the present arrangement, prescribed time slots are designated by the scheduler for the various components of the network switch to access the address table. Assignment of a time slot, however, will not necessarily guarantee access to the address table. Each component of the network switch must further determine, during its assigned time slot, if other components are accessing the address table prior to conducting a transaction. A component may only access the address table during its assigned time slot if no other components are currently conducting transactions with the address table.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of locking an address table within a network switch comprising the steps:

allocating prescribed time slots for accessing the address table to various components of the network switch;

determining, during a time slot allocated to a designated component, if any of the other components are currently transacting with the address table;

locking out the designated component from accessing the address table, if one of the other components is currently transacting with the address table; and allowing the designated component access to the address table if none of the other components are currently transacting with the address table.

2. The method of claim 1, further comprising the steps:

if one of the other components is currently transacting with the network switch, then:

waiting until a next time slot is allocated to the designated component; and repeating the step of determining and the step of allowing.

3. The method of claim 1, further comprising a step of asserting a lock signal prior to the designated component accessing the address table to indicate that the designated component is currently transacting with the address table.

4. The method of claim 1, further comprising a step of outputting lock indication signals to all other components of the network switch to indicate that the designated component is currently transacting with the address table.

5. The method of claim 1, wherein the address table contains plural entries, and further comprising a step of specifying which of the plural entries is being accessed by the designated component.

6. The method of claim 5, wherein:

the step of determining includes a step of determining if any components of the network switch are transacting with a selected entry within the address table; and the step of allowing includes a step of accessing the selected entry, by the designated component, only if none of the other components are currently transacting with the selected entry.

7. The method of claim 1, wherein in response to a central processing unit (CPU) requiring access to the address table, the step of determining comprises the steps:
- placing a request to access the address table through a processor interface that interfaces the CPU to the network switch; and
- determining, by the processor interface, if any other components of the network switch are currently transacting with the address table.

8. The method of claim 7, further comprising the steps:
- locking the address table if none of the other components are currently transacting with the address table; and
- informing the CPU that the address table is available for use.

9. The method of claim 8, wherein the step of informing comprises a step of setting an acknowledge bit in a register of the processor interface for indicating to the CPU that the address table is not being used.

10. An arrangement for controlling access to information stored within a network switch comprising:
- an address table for storing entries that contain addresses of network stations connected to the network switch;
- a plurality of components configured to access said address table; and
- a scheduler for allocating prescribed time slots to said plurality of components for accessing said address table;
- each of said components being configured for determining if any other components are currently transacting with said address table during its allocated time slot, and accessing said address table if none of the other components are currently transacting with said address table;
- wherein a designated component of said plurality of components is configured to assert a lock signal indicating that said designated component is currently transacting with said address table.

11. The arrangement of claim 10, wherein when said address table is being accessed, a designated component of said plurality of components is configured to wait until said scheduler allocates another time slot to said designated component in order to determine if any other components are currently transacting with said address table.

12. The arrangement of claim 10, wherein said designated component is further configured to output a lock indication signal to all other components of said network switch, said lock indication signal indicating that said address table is currently being accessed.

13. The arrangement of claim 12, wherein said lock indication signal specifies which entry in said address table is being accessed.

14. An arrangement for controlling access to information stored within a network switch comprising:
- an address table for storing entries that contain addresses of network stations connected to the network switch;
- a plurality of components configured to access said address table;
- a scheduler for allocating prescribed time slots to said plurality of components for accessing said address table,
- wherein each of said components are configured for determining if any other components are currently transacting with said address table during its allocated time slot, and accessing said address table if none of the other components are currently transacting with said address table;
- a CPU connectable to said network switch; and
- a processor interface for interfacing said CPU to said network switch, said processor interface being configured to:
- receive requests to access said address table from said CPU;
- determine if any components of said network switch are currently transacting with said address table, and
- indicate to said CPU that said address table is available for use if no other components of said network switch are currently transacting with said address table.

15. The arrangement of claim 14, wherein:
- said processor interface is configured to set an acknowledge bit to indicate that said address table is not being used; and
- said CPU is configured to access said address table upon detecting that said acknowledge bit is set.

* * * * *